United States Patent [19]

Loeffler

[11] Patent Number: 5,468,197
[45] Date of Patent: Nov. 21, 1995

[54] SHIFT RAIL POSITION SENSOR FOR VEHICLE TRANSMISSION

[75] Inventor: John M. Loeffler, Toledo, Ohio

[73] Assignee: Dana Corporation, Toledo, Ohio

[21] Appl. No.: 204,628

[22] Filed: Mar. 1, 1994

[51] Int. Cl.⁶ ........................................ B60K 20/02
[52] U.S. Cl. ............... 477/99; 74/473 R; 200/61.88; 200/61.91
[58] Field of Search .............. 477/99; 74/473 R; 200/61.88, 61.91

[56] References Cited

U.S. PATENT DOCUMENTS

| | | | |
|---|---|---|---|
| 2,511,054 | 6/1950 | Ferguson et al. | 477/99 |
| 3,534,637 | 10/1970 | Tomlinson . | |
| 3,601,231 | 8/1971 | Kolacz et al. | 477/99 X |
| 4,275,612 | 6/1981 | Silvester | 477/99 X |
| 4,301,692 | 11/1981 | Frazee | 74/476 |
| 4,415,786 | 11/1983 | Takada et al. | 200/61.91 |
| 4,491,039 | 1/1985 | Benedek et al. | 477/99 |
| 5,031,472 | 7/1991 | Dutson et al. | 200/61.91 X |

FOREIGN PATENT DOCUMENTS

| | | | |
|---|---|---|---|
| 89856 | 3/1990 | Japan | 200/61.91 |

Primary Examiner—Rodney H. Bonck
Assistant Examiner—Troy Grabow
Attorney, Agent, or Firm—MacMillan, Sobanski & Todd

[57] ABSTRACT

A neutral start switch assembly for a vehicle transmission including a case having a plurality of generally parallel shift rails supported therein is disclosed. Each of the shift rails is longitudinally movable forwardly and rearwardly from a central neutral position to first and second gear engaging positions. A notch is formed in the outer surface of each of the shift rails. These notches are aligned with one another when all of the shift rails are in their central neutral positions. The neutral start switch assembly includes an actuator lever which is pivotably mounted to the transmission case. One end of the actuator lever cooperates with the notches formed on each of the shift rails. The other end of the actuator lever cooperates with a neutral start switch mounted on the transmission case. When all of the shift rails are in their central neutral positions, the actuator lever is moved to a first position. When any one of the shift rails is moved out of its central neutral position, the actuator lever is moved to a second position. Such movement of the actuator lever causes operation of the neutral start switch to prevent the vehicle engine from being started unless all of the shift rails are in their central neutral positions.

22 Claims, 3 Drawing Sheets

SHIFT RAIL POSITION SENSOR FOR VEHICLE TRANSMISSION

BACKGROUND OF THE INVENTION

This invention relates in general to vehicle transmissions and in particular to an assembly for sensing the movement of a transmission shift rail in and out of a central neutral position and for operating a neutral start switch in response thereto.

In most vehicles, a transmission is provided in the drive train between the engine and the driven wheels. As is well known, the transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. Thus, by appropriate selection of these gear ratios, acceleration and deceleration of the vehicle can be accomplished in a smooth and efficient manner.

In a conventional vehicle transmission, a pivotable shift lever is provided for selecting and engaging a desired one of the gear ratios for use. The upper end of the shift lever extends upwardly into the driver compartment of the vehicle, where it can be grasped and manually moved by the driver. The lower end of the shift lever extends downwardly within the transmission case into cooperation with a plurality of shift rails. The shift rails are typically oriented in adjacent parallel fashion within the transmission case. Each of the shift rails is supported for longitudinal movement in opposite axial directions from a central neutral position to either of two gear engaging positions. Appropriate movement of the shift lever causes selection and longitudinal movement of one of the shift rails and, therefore, engagement of a desired gear ratio for use.

In vehicle transmissions of this general type, it is well known to provide a neutral start switch assembly for preventing the vehicle engine from being started unless all of the shift rails are in their central neutral positions. This is done to avoid unexpected vehicle movement caused by starting the engine while the transmission is in gear. Such neutral start switch assemblies typically include a normally closed switch, commonly referred to as a neutral start switch, which is connected in the ignition circuit of the vehicle engine. An actuator mechanism is provided for sensing when any one of the shift rails is moved out of its central neutral position and for opening the neutral start switch in response thereto. When this occurs, the ignition system of the vehicle engine is disabled and cannot be started.

A number of neutral start switch assemblies are known in the art for performing this function. However, these known assemblies have been found to be unduly complex in structure and space consuming within the transmission. Inasmuch as modern vehicle transmissions are becoming increasingly smaller in physical size, the space available within the transmission case for these neutral start switch assemblies is becoming increasingly limited. Thus, it would be desirable to provide an improved structure for a neutral start switch assembly which is simple in construction and compact in size.

SUMMARY OF THE INVENTION

This invention relates to an improved structure for a neutral start switch assembly adapted for use in a vehicle transmission. The transmission includes a case having a plurality of generally parallel shift rails supported therein. Each of the shift rails is longitudinally movable forwardly and rearwardly from a central neutral position to first and second gear engaging positions. A notch is formed in the outer surface of each of the shift rails. These notches are aligned with one another when all of the shift rails are in their central neutral positions. The neutral start switch assembly includes an actuator lever which is pivotably mounted to the transmission case. One end of the actuator lever cooperates with the notches formed on each of the shift rails. The other end of the actuator lever cooperates with a neutral start switch mounted on the transmission case. When all of the shift rails are in their central neutral positions, the actuator lever is moved to a first position. When any one of the shift rails is moved out of its central neutral position, the actuator lever is moved to a second position. Such movement of the actuator lever causes operation of the neutral start switch to prevent the vehicle engine from being started unless all of the shift rails are in their central neutral positions.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
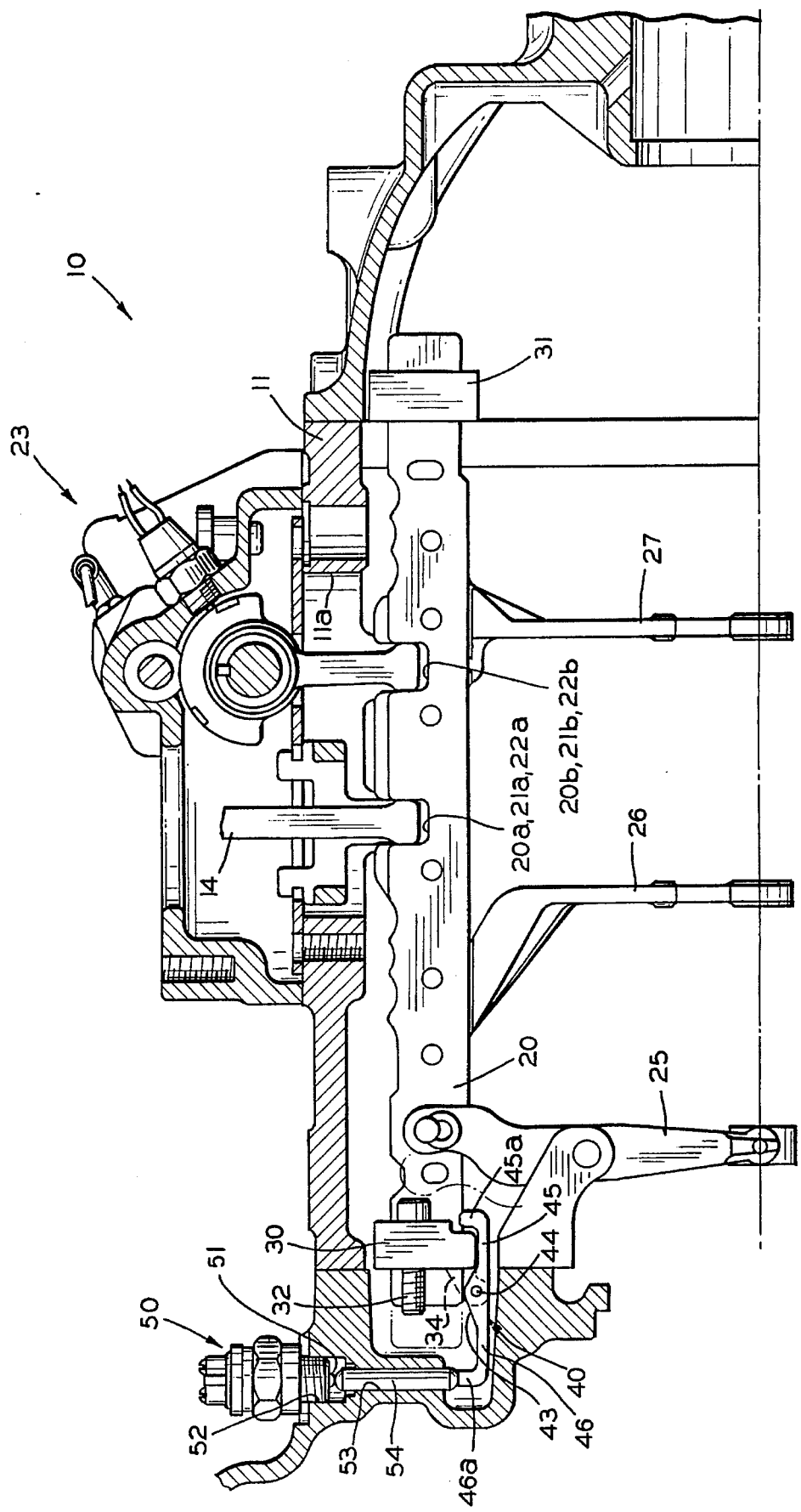
FIG. 1 is a side elevational view, partially in cross section, of a top portion of a vehicle transmission including a shift rail position sensor in accordance with this invention.

Referring now to the drawings, there is illustrated in FIG. 1 an upper portion of a vehicle transmission, indicated generally at 10, in accordance with this invention. The non-illustrated lower portion of the transmission 10, which includes a plurality of meshing gears mounted on main and counter shafts, is conventional in the art and is so well known that a discussion thereof is not necessary for a full and complete understanding of the invention. The transmission 10 includes a case 11 having an opening 11a formed through the upper portion thereof. A shift housing (not shown) is secured to the upper portion of the of the case 11 about the opening 11a. The shift housing includes a conventional shift tower assembly (not shown) which is secured thereto by any conventional means.

As is well known, a manually operated shift lever (a lower end of which is illustrated at 14 in FIG. 1) is mounted on the shift tower assembly for pivoting movement relative thereto. The upper end of the shift lever 14 extends upwardly into a vehicle cab (not shown) where it can be easily grasped and moved by a driver. The lower end of the shift lever 14 extends downwardly through the shift housing and the opening 11a formed through the case 11 into the transmission 10. Alternatively, the manually operated shift lever 14 may be replaced by a conventional remote actuator (not shown) having a lower end which also extends downwardly through the shift housing and the opening 11a into the transmission 10.

A plurality of elongated shift rails 20, 21, and 22 are provided within the transmission 10. The shift rails 20, 21, and 22 are supported in parallel fashion within the transmission case 11 in a manner described below. Each of the shift rails 20, 21, and 22 is longitudinally movable from a central neutral position to either a forward position (to the left when viewing FIG. 1) to engage a first gear ratio, or to a rearward position (toward the right when viewing FIG. 1) to engage a second gear ratio. To accomplish this, first upper notches 20a, 21a, and 22a are respectively formed in the upper surfaces of the shift rails 20, 21, and 22. The first upper notches 20a, 21a, and 22a are aligned with one another in a direction which is transverse to the longitudinal axes of the shift rails 20, 21, and 22 when such shift rails 20, 21, and 22 are all in their central neutral positions. The lower end of the shift lever 14 extends downwardly into the transmission case 11 into cooperation with the first upper notches 20a, 21a, and 22a. Thus, movement of the shift lever 14 causes selection and movement of the shift rails 20, 21, and 22, as is well known in the art.

If desired, second upper notches 20b, 21b, and 22b may be respectively formed in the upper surfaces of the shift rails 20, 21, and 22. The second upper notches 20b, 21b, and 22c are also aligned with one another in a direction which is transverse to the longitudinal axes of the shift rails 20, 21, and 22 when such shift rails 20, 21, and 22 are all in their central neutral positions. The second upper notches 20b, 21b, and 22b are provided to cooperate with an automatic shifting mechanism, indicated generally at 23, mounted on the upper surface of the transmission case 11. Thus, the selection and movement of the shift rails 20, 21, and 22 may be performed automatically by the automatic shifting mechanism 23, instead of manually by physical movement of the shift lever 14. The automatic shifting mechanism 23 forms no part of this invention.

Figure 4:
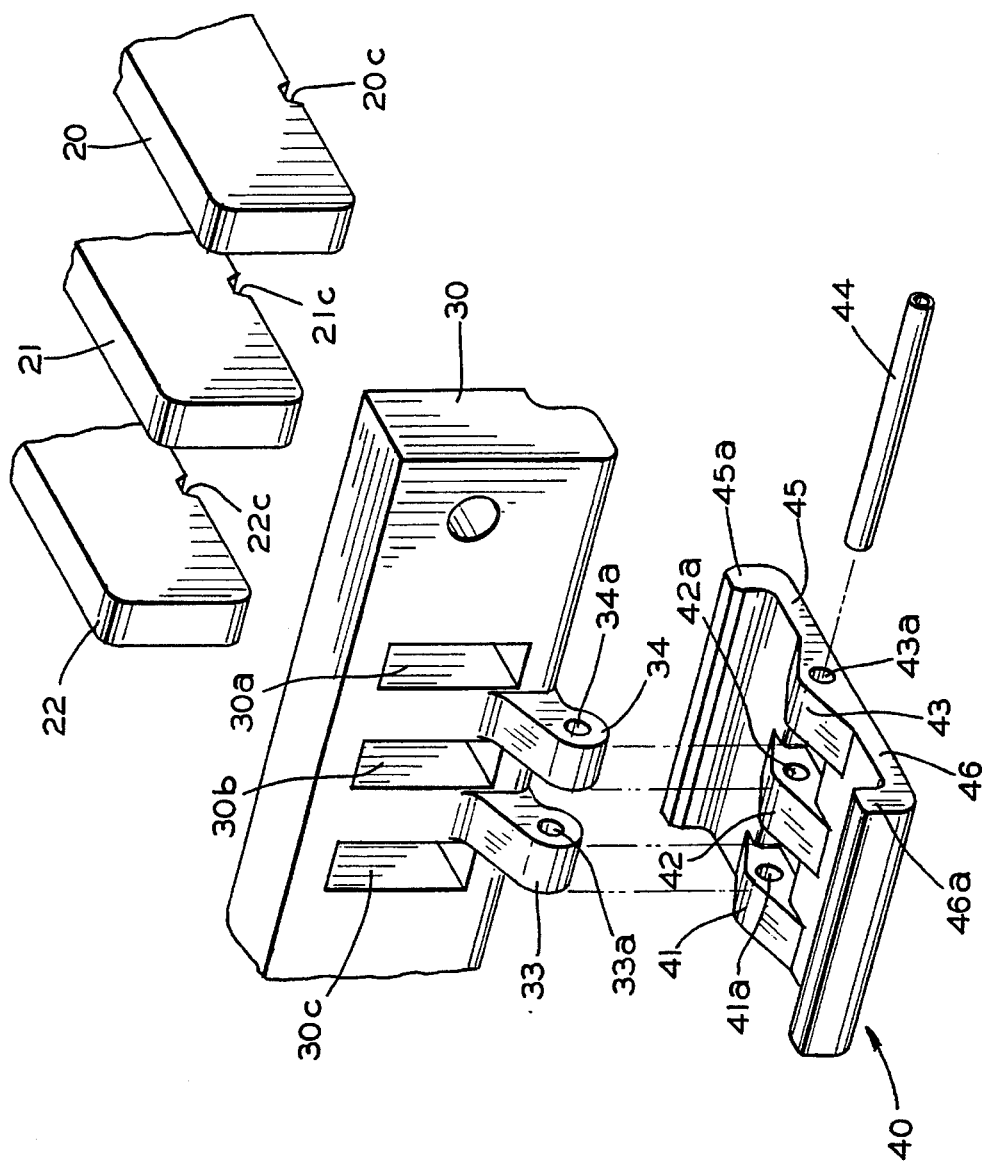
FIG. 4 is an exploded perspective view of the shift rail position sensor illustrated in FIGS. 1 through 3, including portions of the shift rails of the transmission.

As best shown in FIG. 4, a plurality of lower notches 20c, 21c, and 22c are respectively formed in the lower surfaces of the shift rails 20, 21, and 22. The lower notches 20c, 21c, and 22c are also aligned with one another in a direction which is transverse to the longitudinal axes of the shift rails 20, 21, and 22 when such shift rails 20, 21, and 22 are all in their central neutral positions. The lower notches 20c, 21c, and 22c define respective first surface portions of the lower surfaces of the respective shift rails 20, 21, and 22, while the adjacent lower surface portions of the shift rails 20, 21, and 22 define respective second surface portions. The first surface portion of each shift rail 20, 21, and 22 can be either raised or indented relative to the second surface portion thereof. The purposes of the lower notches 20c, 21c, and 22c will be explained below.

A first shift fork 25 is connected to the first shift rail 20 by rivets or other conventional means for movement therewith. Similarly, a second shift fork 26 is connected to the second shift rail 21, and a third shift fork 27 is connected to the third shift rail 22. The shift forks 25, 26, and 27 extend downwardly from their associated shift rails 20, 21, and 22 into engagement with respective gear engaging mechanisms (not shown) provided in the lower portion of the transmission 10. The shift forks 25, 26, and 27 and the gear engaging mechanisms are conventional in the art.

The components of the transmission 10 thus far described constitute the basic structure of the main section of the transmission 10, which provides a predetermined number of speed reduction gear ratios between the input and output shafts thereof (not shown). In the illustrated embodiment, the first shift rail 20 is provided for shifting between fourth and fifth gear ratios, the second shift rail 21 is provided for shifting between second and third gear ratios, and the third shift rail 22 is provided for shifting between reverse and first gear ratios. Thus, the illustrated main section of the transmission 10 is a five-speed transmission.

The shift rails 20, 21, and 22 are each supported for longitudinal movement within the transmission case 11 by front and rear support members 30 and 31. To accomplish this, the front support member 30 is formed having a plurality of openings 30a, 30b, and 30c. The forward ends of the shift rails 20, 21, and 22 are respectively received and supported in the openings 30a, 30b, and 30c for sliding movement relative thereto. The rear support member 30 has similar openings (not shown) formed therethrough for receiving and supporting the rearward ends of the shift rails 20, 21, and 22 for sliding movement. The front and rear support members 30 and 31 are secured to the transmission case 11 in any conventional manner, such as by a plurality of bolts 32.

The front support member 30 has a pair of hinge ears 33 and 34 formed integrally therewith. Although two of such hinge ears 33 and 34 are illustrated, it will be appreciated that any number of such hinge ears may be provided on the front support member 30. The hinge ears 33 and 34 are essentially identical in shape, each extending forwardly and downwardly from the front support member 30. Respective apertures 33a and 34a are formed through the hinge ears 33 and 34. The apertures 33a and 34a preferably extend transversely to the longitudinal axes of the shift rails 20, 21, and 22 and are co-axially aligned with one another.

An actuator lever, indicated generally at 40, is pivotably supported on the hinge ears 33 and 34 of the front support member 30. To accomplish this, the actuator lever 40 has a plurality of hinge ears 41, 42, and 43 formed integrally therewith. Although three of such hinge ears 41, 42, and 43 are illustrated, it will be appreciated that any number of such hinge ears may be provided on the actuator lever 40. The hinge ears 41, 42, and 43 are essentially identical in shape, each extending upwardly from the actuator lever 40. Respective apertures 41a, 42a, and 43a are formed through the hinge ears 41, 42, and 43. The apertures 41a, 42a, and 43a preferably extend transversely to the longitudinal axes of the shift rails 20, 21, and 22 and are co-axially aligned with one another.

The hinge ears 41, 42, and 43 formed on the actuator lever 40 are sized and spaced apart from one another such that the first hinge ear 33 formed on the front support member 30 is received between the first hinge ear 41 and the second hinge ear 42 formed on the actuator lever 40. Similarly, the second hinge ear 34 formed on the front support member 30 is received between the second hinge ear 42 and the third hinge ear 43 formed on the actuator lever 40. When assembled in this manner, the apertures 41a, 42a, and 43a of the lever plate hinge ears 41, 42, and 43 are co-axially aligned with the apertures 33a and 34a of the front support member 30 hinge ears 33 and 34.

Figure 2:
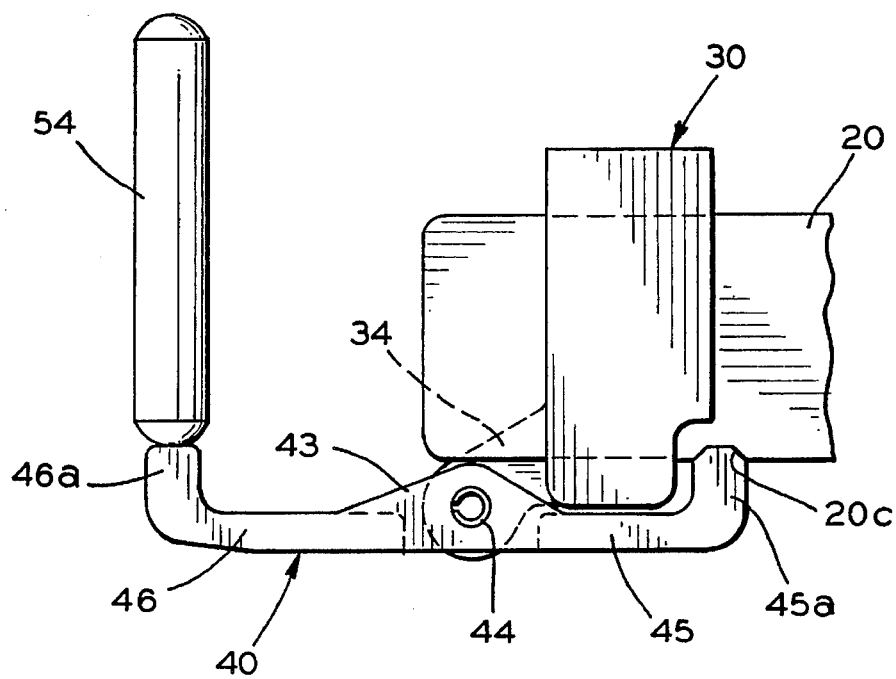
FIG. 2 is an enlarged side elevational view of the shift rail position sensor illustrated in FIG. 1, wherein all of the shift rails are shown in their central neutral positions.
Figure 3:
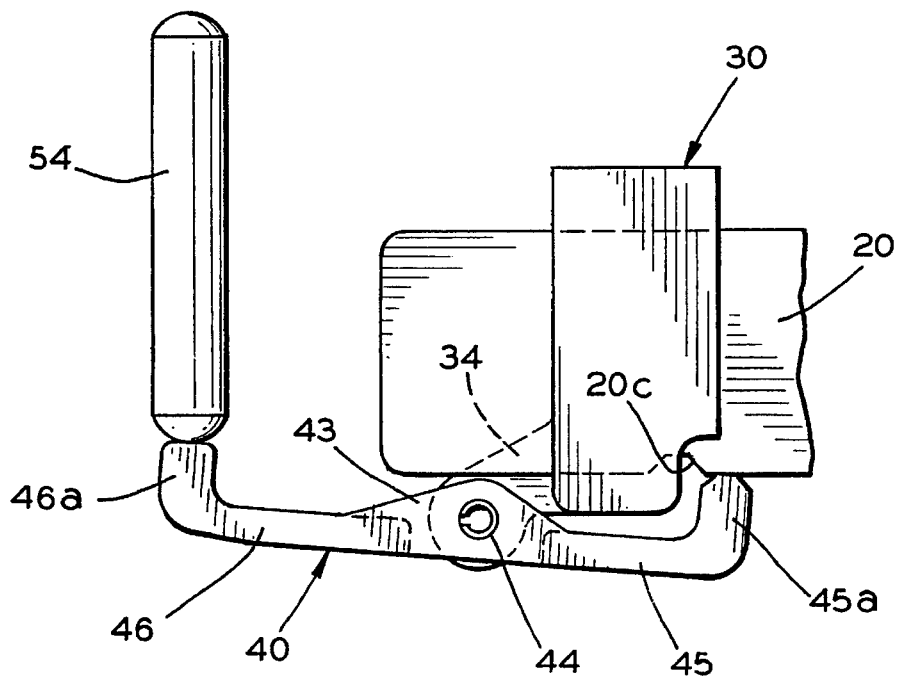
FIG. 3 is an enlarged side elevational view similar to FIG. 2, wherein one of the shift rails is shown in a gear engaging position.

A pivot pin 44 extends through the aligned apertures 33a, 34a, 41a, 42a, and 43a on the front support member 30 and the actuator lever 40. Preferably, the pivot pin 44 is embodied as a generally C-shaped spring pin, as best shown in FIGS. 2 and 3. As a result, the actuator lever 40 is mounted on the front support member 30 for pivoting movement about a pivot axis defined by the pivot pin 44. The actuator lever 40, therefore, is divided into two arm portions, namely, a rearward arm portion 45 which extends rearwardly from the pivot axis and a forward arm portion 46 which extends forwardly from the pivot axis. The rearward and forward arm portions 45 and 46 terminate in respective transverse ridges 45a and 46a which extend upwardly therefrom.

As shown in FIGS. 1, 2, and 3, the upstanding ridge 45a of the rearward arm portion 45 engages the lower surfaces of all of the shift rails 20, 21, and 22. When all of the shift rails 20, 21, and 22 are located in their central neutral positions, the upstanding ridge 45a of the rearward arm portion 45 is received in each of the lower notches 20c, 21c, and 22c of the shift rails 20, 21, and 22. As a result, the actuator lever 40 is oriented in a first position illustrated in FIG. 2. However, when any of the shift rails 20, 21, and 22 is moved out of its central neutral position either forwardly or rearwardly into a gear engaging position, the associated one of the lower notches 20c, 21c, and 22c is moved away from the ridge 45a. As a result, the actuator lever 45 is pivoted clockwise to a second position illustrated in FIG. 3.

A conventional neutral start switch, indicated generally at 50, is mounted in a threaded bore 52 formed through the case 11 of the transmission 10. The neutral start switch 50 is connected in a known manner to an ignition circuit (not shown) of the vehicle. The illustrated neutral start switch 50 is embodied as a single pole, single throw electrical switch. Typically, the neutral start switch 50 is biased to be operated in a first condition, wherein a closed electrical circuit is completed in the vehicle ignition circuit to permit starting of the vehicle engine. However, the neutral start switch 50 can be operated in a second condition, wherein an opened electrical circuit is created in the vehicle ignition circuit to prevent starting of the vehicle engine. A spring loaded ball 51 may be provided in the lower end of the neutral start switch 50 for effecting the operation thereof.

To operate the neutral start switch 50, an actuator rod 54 is slidably disposed within a bore 53 formed in the transmission case 11. The bore 53 is preferably disposed co-axially with the tapped bore 52 within which the neutral start switch 50 is mounted. The lower end of the actuator pin 54 rests upon the upstanding ridge 46a of the forward arm portion 46 of the actuator lever 40, while the upper end thereof is disposed adjacent to the lower end of the neutral start switch 50. Preferably, the actuator pin 54 is lightly engaged by the spring loaded ball 51 of the neutral start switch 50 so as to lightly urge the upstanding ridge 45a of the rearward arm portion 45 into engagement with the lower surfaces of the shift rails 20, 21, and 22.

Thus, when all of the shift rails 20, 21, and 22 are in their central neutral positions, the rearward arm portion 45 of the actuator lever 40 is pivoted upwardly as shown in FIG. 2. Consequently, the forward arm portion 46 of the actuator lever 40 and the actuator rod 54 are moved downwardly, and the neutral start switch 50 is operated in the first condition discussed above, wherein a closed electrical circuit is completed in the vehicle ignition circuit to permit starting of the vehicle engine. However, when any of the shift rails 20, 21, and 22 are moved out of their central neutral positions, the rearward arm portion 45 of the actuator lever 40 is pivoted downwardly as shown in FIG. 3. Consequently, the forward arm portion 46 of the actuator lever 40 and the actuator rod 54 are moved upwardly, and the neutral start switch 50 is operated in the second condition, wherein an opened electrical circuit is created in the vehicle ignition circuit to prevent starting of the vehicle engine. When all of the shift rails 20, 21, and 22 are subsequently returned to their central neutral position, the neutral start switch 50 is operated in the first condition, as discussed above.

Preferably, the distance between the pivot axis of the actuator lever 40 and the upstanding ridge 45a provided on the rearward arm 45 thereof is somewhat greater than the distance between the pivot axis and the upstanding ridge 46a provided on the forward arm 46. As a result, axial movement of any one of the shift rails 20, 21, and 22 is amplified by the pivoting action of the actuator lever 40. This enables neutral start switch 50 to sense relatively small axial movements of any one of the shift rails 20, 21, and 22, and change operating conditions more quickly in response thereto. This insures that the neutral start switch 50 will be operated in the second operating condition (to prevent starting of the vehicle engine) before any one of the shift rails 20, 21, and 22 is moved longitudinally a sufficient distance to engage one of its associated gear ratios. It has been found acceptable to form the actuator lever 40 such that the ratio between the distance between the pivot axis and the upstanding rearward ridge 45a and the distance between the pivot axis and the forward upstanding ridge 46a is approximately 1.3 to 1.5.

Further in this regard, it is preferable that the upper end of the actuator pin 54 engage (or at least be disposed very close to) the ball 51 of the neutral start switch 50 when the actuator lever 40 is in its first position illustrated in FIG. 2. As will be readily appreciated, if there was a large gap between the upper end of the actuator pin 54 and the ball 51, a larger amount of longitudinal movement of any one of the shift rails 20, 21, and 22 would be required before the switch 50 would be operated. Moreover, by pivotably mounting the actuator lever 40 to the front support member 23, any tolerance stack-up in the various components is reduced, facilitating the achievement of the desired configuration.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A transmission comprising:

a case containing an input shaft and an output shaft;

a shift rail supported for movement within said case between a first position, wherein said input shaft is not connected to said output shaft, and a second position, wherein said input shaft is connected to said output shaft, said shift rail having a surface including a first surface portion and a second surface portion;

a neutral start switch supported on said case and operable in first and second conditions; and an actuator lever mounted on said case for pivoting movement relative thereto, a first end of said actuator lever slidably engaging said surface of said shift rail and a second end of said actuator lever engaging said neutral start switch, said first end of said actuator lever engaging said first surface portion when said shift rail is in said first position so as to maintain said actuator lever in a first position to operate said neutral start switch in said first condition, said first end of said actuator lever engaging said second surface portion when said shift rail is in said second position so as to maintain said actuator lever in a second position to operate said neutral start switch in said second condition.

2. The transmission defined in claim 1 wherein said actuator lever is mounted on said case for pivoting movement about a pivot axis intermediate said first and second ends thereof.

3. The transmission defined in claim 2 wherein a first distance defined between said pivot axis and said first end of said actuator lever is shorter than a second distance defined between said pivot axis and said second end of said actuator lever.

4. The transmission defined in claim 3 wherein the ratio between said first distance and said second distance is approximately 1.3 to 1.5.

5. The transmission defined in claim 1 wherein said first end of said actuator lever has a projection formed thereon which slidably engages said surface of said shift rail.

6. The transmission defined in claim 1 wherein said second end of said actuator lever has a projection formed thereon which engages said neutral start switch.

7. The transmission defined in claim 1 wherein said first surface portion of said shift rail is defined by a notch formed in said shift rail, and wherein said first end of said actuator lever is received in said notch when said shift rail is in said first position so as to maintain said actuator lever in said first position.

8. The transmission defined in claim 1 further including a support member mounted on said case for slidably supporting said shift rail, said actuator lever being pivotably mounted on said support member.

9. The transmission defined in claim 8 wherein said actuator lever includes a first hinge member and said support member includes a second hinge member, said first and second hinge members being connected together by a hinge pin.

10. The transmission defined in claim 9 wherein said first hinge member includes a plurality of hinge ears, said second hinge member includes a plurality of hinge ears, and said hinge pin extends through said pluralities of hinge ears formed on said first and second hinge member.

11. The transmission defined in claim 1 further including an actuator pin slidably supported on said case and having a first end which engages said neutral start switch and a second end which engages said second end of said actuator lever.

12. A transmission comprising:
   a case containing an input shaft and an output shaft;
   a plurality of shift rails, each of said shift rails being supported for movement within said case between a first position, wherein said input shaft is not connected to said output shaft, and a second position, wherein said input shaft is connected to said output shaft, each of said shift rails having a surface including a first surface portion and a second surface portion;
   a neutral start switch supported on said case and operable in first and second conditions; and
   an actuator lever mounted on said case for pivoting movement relative thereto, a first end of said actuator lever slidably engaging said surfaces of said shift rails and a second end of said actuator lever engaging said neutral start switch, said first end of said actuator lever engaging all of said first surface portions when all of said shift rails are in said first position so as to maintain said actuator lever in a first position to operate said neutral start switch in said first condition, said first end of said actuator lever engaging one of said second surface portions when said one of said shift rails is in said second position so as to maintain said actuator lever in a second position to operate said neutral start switch in said second condition.

13. The transmission defined in claim 12 wherein said actuator lever is mounted on said case for pivoting movement about a pivot axis intermediate said first and second ends thereof.

14. The transmission defined in claim 13 wherein a first distance defined between said pivot axis and said first end of said actuator lever is shorter than a second distance defined between said pivot axis and said second end of said actuator lever.

15. The transmission defined in claim 14 wherein the ratio between said first distance and said second distance is approximately 1.3 to 1.5.

16. The transmission defined in claim 12 wherein said first end of said actuator lever has a projection formed thereon which slidably engages said surfaces of said shift rails.

17. The transmission defined in claim 12 wherein said second end of said actuator lever has a projection formed thereon which engages said neutral start switch.

18. The transmission defined in claim 12 wherein said first surface portions of said shift rails are each defined by a notch formed therein, and wherein said first end of said actuator lever is received in said notches when all of said shift rails are in said first position so as to maintain said actuator lever in said first position.

19. The transmission defined in claim 12 further including a support member mounted on said case for slidably supporting said shift rails, said actuator lever being pivotably mounted on said support member.

20. The transmission defined in claim 19 wherein said actuator lever includes a first hinge member and said support member includes a second hinge member, said first and second hinge members being connected together by a hinge pin.

21. The transmission defined in claim 20 wherein said first hinge member includes a plurality of hinge ears, said second hinge member includes a plurality of hinge ears, and said hinge pin extends through said pluralities of hinge ears formed on said first and second hinge member.

22. The transmission defined in claim 22 further including an actuator pin slidably supported on said case and having a first end which engages said neutral start switch and a second end which engages said second end of said actuator lever.

* * * * *

UNITED STATES PATENT AND TRADEMARK OFFICE
CERTIFICATE OF CORRECTION

PATENT NO. : 5,468,197
DATED : November 21, 1995
INVENTOR(S) : John M. Loeffler

It is certified that error appears in the above-identified patent and that said Letters Patent is hereby corrected as shown below:

Column 8, Claim 22, Line 1, after "claim", change "22" to -- 12 --.

Signed and Sealed this

Twentieth Day of February, 1996

Attest:

BRUCE LEHMAN

Attesting Officer

Commissioner of Patents and Trademarks